US008615744B2

(12) United States Patent
Ben-Artzi et al.

(10) Patent No.: US 8,615,744 B2
(45) Date of Patent: Dec. 24, 2013

(54) METHODS AND SYSTEM FOR MANAGING ASSETS IN PROGRAMMING CODE TRANSLATION

(75) Inventors: Guy Ben-Artzi, Palo Alto, CA (US);
Yotam Shacham, Palo Alto, CA (US);
Yehuda Levi, Rishon Lezion (IL);
Russell William McMahon, Woodside, CA (US)

(73) Assignee: Beek Fund B.V. L.L.C., Dover, DE (US)

( * ) Notice: Subject to any disclaimer, the term of this patent is extended or adjusted under 35 U.S.C. 154(b) by 404 days.

(21) Appl. No.: 13/023,606

(22) Filed: Feb. 9, 2011

(65) Prior Publication Data
US 2012/0204159 A1  Aug. 9, 2012

(51) Int. Cl.
*G06F 9/45* (2006.01)

(52) U.S. Cl.
USPC .......................................................... 717/137

(58) Field of Classification Search
None
See application file for complete search history.

(56) References Cited

U.S. PATENT DOCUMENTS

| | | | |
|---|---|---|---|
| 6,634,022 B1 * | 10/2003 | Leermakers | 717/158 |
| 8,051,410 B2 * | 11/2011 | Marfatia et al. | 717/137 |
| 2011/0247016 A1 * | 10/2011 | Seong | 719/328 |

* cited by examiner

*Primary Examiner* — Philip Wang
(74) *Attorney, Agent, or Firm* — Novak Druce Connolly Bove + Quigg LLP

(57) ABSTRACT

Managing assets during translation of source application to a target application may involve analyzing the source application to generate a database of characteristics of source assets. Thereafter, performance metrics for a target platform may be determined based on the characteristics of the source assets. Subsequently, the source assets may be processed based on the performance metrics to generate target assets.

35 Claims, 4 Drawing Sheets

METHODS AND SYSTEM FOR MANAGING ASSETS IN PROGRAMMING CODE TRANSLATION

FIELD OF THE INVENTION

Embodiments of the invention may relate to computer aided translation of programming code and more specifically to managing assets in programming code translation.

BACKGROUND OF THE INVENTION

Various users across the globe communicate or perform various activities on computer and device networks. Moreover, the users interact with each other through the networks, such as the Internet. Typically, the users use devices like personal computers to interact over the Internet. The users can interact from various Internet websites or social networking sites, for example, Facebook, Myspace, Hi5, and Orkut etc. Recently, the development in mobile devices such as cell phones, smartphones and PDAs, computers, laptops and the like has enabled them to be used for performing various activities on networks such as the Internet. Moreover, the mobile devices can be used for real-time interaction with other users on the network. The interaction or communication can be in the form of chatting, playing interactive online games, browsing, shopping, music, video, banking, business and the like.

The rapid pace of innovation in technology has generated various types of devices and platforms. Moreover, the number of devices is increasing rapidly. For example, there are various operating systems available for the devices such as Windows, Linux, Macintosh, and Symbian, etc. Moreover, a large number of J2ME platforms are available for the mobile devices such as cell phones. Furthermore, the mobile devices have a wide range of capabilities in terms of screen size, screen type, screen resolution, processor, and memory etc. The applications for these devices have to be developed based on their platforms. Therefore, each application has to be ported to other platforms. For example, in the case of computer games the programming languages typically used are JAVA, C#, C++, Action Script, and the like. Therefore, an application developed in Action Script programming language may have to be ported to another programming language when not supported by a device platform. Further, new applications are being continuously developed for different device platforms.

Generally, translating application code from a source computer programming language to target programming languages may require porting and managing system and program level assets. Examples of assets may include images, audio files, video files, or other media required by the application. Further, different target operating systems may have different run time environments or platforms. Therefore, different level or type of conversion or management of the assets may be required for the assets to perform efficiently in those platforms.

Moreover, the translation process may impact the quality of the assets. For example, an image in Bitmap (BMP) format may be converted to Joint Photographic Experts Group (JPEG) format as a standard or a default format. However, the quality of the image may be unnecessarily reduced in this process. Further, the compatibility of the target format with the target environment may not be determined. As a result, the application may not execute on the target platform.

Typically, the assets for the application code may be stored in directories or folders. The characteristics of the assets such as name, extension or address may change or get updated during the conversion. Therefore, the target code should refer to the updated characteristics of the assets. However, each asset may be referenced multiple times in the application code. Therefore, the translation process is required to syntactically analyze each asset reference in the application code separately and repeatedly. However, this process might be time consuming and less efficient.

In light of the above discussion, methods and systems are therefore desirable to manage assets during translation of programming code.

SUMMARY

Embodiments of the invention may provide a method for managing assets during translation of a computer application code from a source computer program language code to a target computer program language code. The method may comprise analyzing the application code in the source programming language code to generate a database of characteristics of a plurality of source assets; determining a plurality of performance metrics for a target platform based on the characteristics of the source assets, wherein the target computer program language code executes on the target platform; and processing the one or more source assets based on the performance metrics to generate one or more target assets.

Embodiments of the invention may further provide a computer-implemented system for managing assets during translation of a computer application code: from a source computer program language code to a target computer program language code. The system may comprise a database for storing characteristics of one or more source assets and a memory coupled to the database. The memory may store one or more instructions for: analyzing the application code in the source programming language code to generate a database of characteristics of a plurality of source assets; determining a plurality of performance metrics for a target platform based on the characteristics of the source assets, wherein the target computer program language code executes on the target platform; and processing the one or more source assets based on the performance metrics to generate one or more target assets. Further, the system may comprise a processor coupled to the memory, wherein the processor is configured to execute the instructions stored in the memory.

Embodiments of the present invention may further provides a computer-readable medium having computer-executable instructions executable by a processor for managing assets during translation of a computer application code from a source computer program language code to a target computer program language code. The instructions, if executable, may result in operations comprising: analyzing the application code in the source programming language code to generate a database of characteristics of a plurality of source assets; determining a plurality of performance metrics for a target platform based on the characteristics of the source assets, wherein the target computer program language code executes on the target platform; and processing the one or more source assets based on the performance metrics to generate one or more target assets.

BRIEF DESCRIPTION OF THE DRAWINGS

Figure 1:
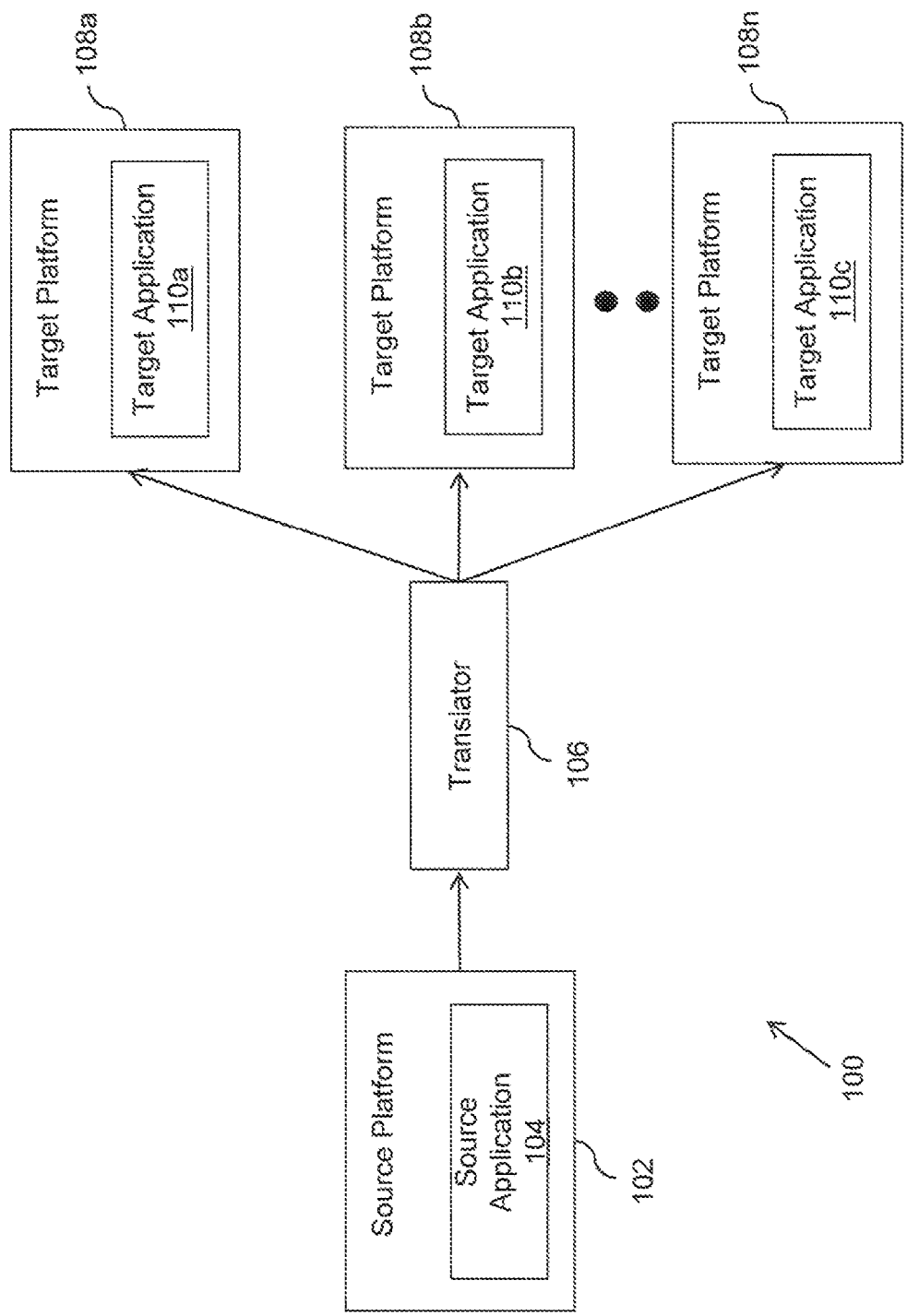
Figure 2:
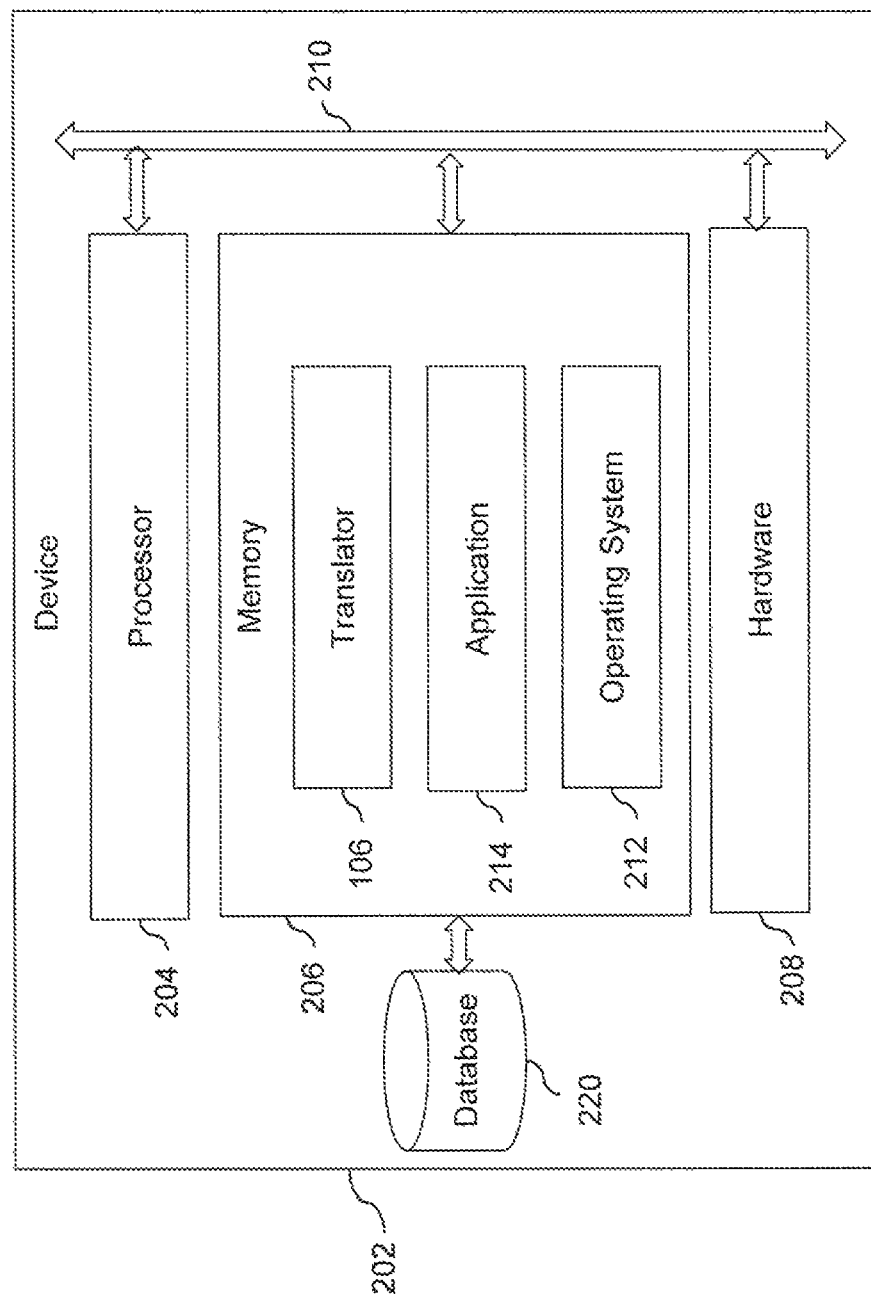
Figure 3:
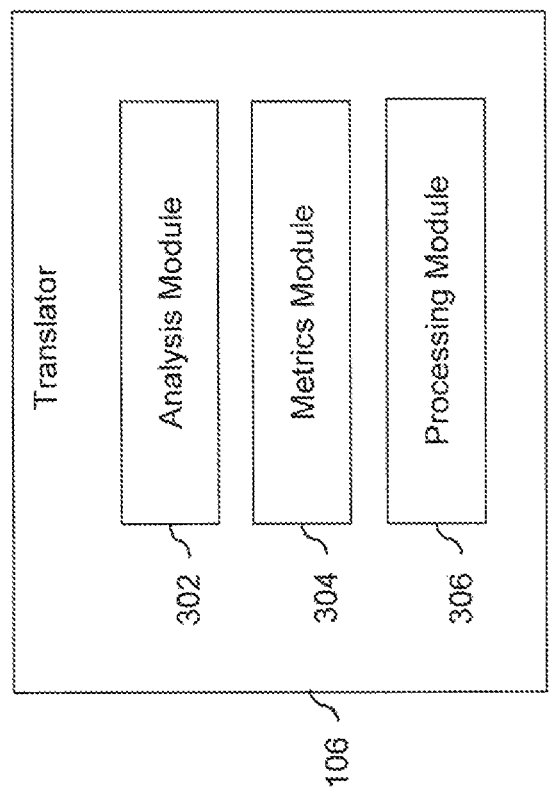
Figure 4:
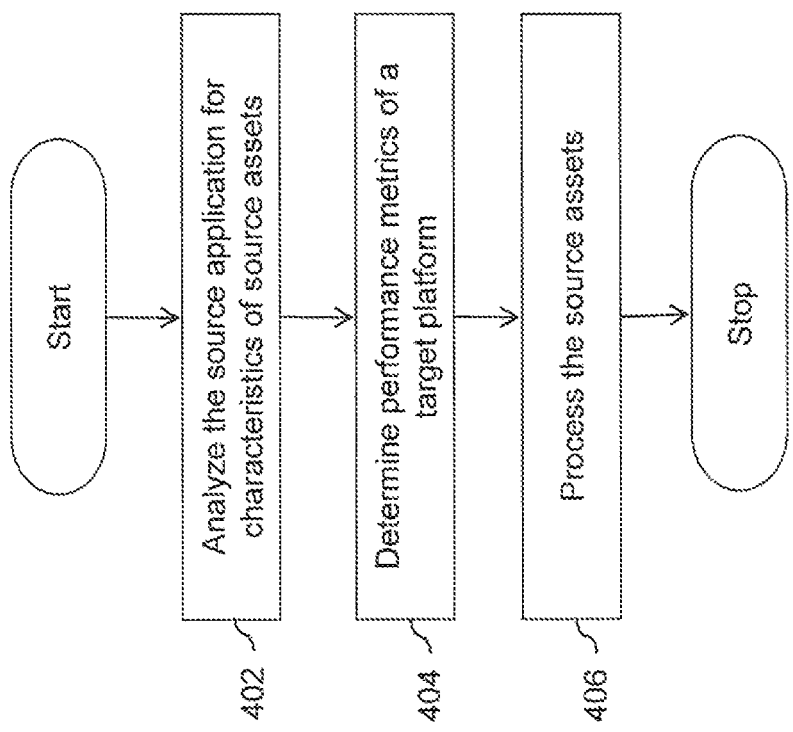

Having thus described embodiments of the invention in general terms, reference will now be made to the accompanying drawings, which are not necessarily drawn to scale, and wherein:

FIG. 1 illustrates an exemplary environment where the embodiments of the invention may function;

FIG. 2 illustrates exemplary components of a device implementing a translator, in accordance with an embodiment of the invention;

FIG. 3 illustrates components of the translator, in accordance with an embodiment of the invention; and FIG. 4 is a flowchart of a method for managing assets during translation of a source application, in accordance with an embodiment of the invention.

DETAILED DESCRIPTION OF EMBODIMENTS OF THE INVENTION

Illustrative embodiments of the invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

FIG. 1 illustrates an exemplary environment 100 where various embodiments of the invention may function. Generally, computer applications may be designed, for a particular platform based on the characteristics of the platform. For example, characteristics may include, but are not limited to, the Operating System (OS), processor, memory, display capabilities, audio capability, video capability, and so forth. Further, the code and assets of the application may be tested and optimized for the particular platform. Moreover, various platforms may only support applications, written in specific programming languages. Therefore, an application may be required to be translated for use on target platforms. As shown with reference to FIG. 1, a translator 106 may translate a source application 104 of a source platform 102 to target applications 110a-n of respective target platforms 108a-n. Source application 104 may include source code and source assets. Source code can be, for example, instructions written in a programming language such as, but not limited to, C, C++, JAVA, ASP, or other programming languages. An application may require assets such as images, videos, audio, etc., e.g., to present an interface to the users. The assets may generally be referenced in the source code for presentation and/or interaction. For example, a gaming application may require assets such images to display on a screen for the user to interact. Moreover, the assets may have various characteristics. The characteristics may be, for example, the format, size, or resolution of an image; or format, size, resolution, bit rate, volume and the like for audio or video assets. Exemplary formats for an asset such as an image can be JPEG, BMP, GIF, and so forth. Similarly, exemplary characteristics of a video asset can be an MPEG or AVI format, 320×480 or 240×360 resolution, 244 kHz bit rate, memory size and so forth. However, different platforms may support different characteristics of the assets. For example, a platform with limited memory and processing capability may not be able to use an asset with a high bit rate and large memory size. Therefore, source code and source assets may be required to be translated for effective operation based on the characteristics of target platforms 108a-n.

FIG. 2 shows exemplary components of a device 202 in which translator 102 may be implemented, according to an embodiment of the invention. As shown, translator 102 may be a component of device 202; however, a person skilled in the art will appreciate that translator 102 may function as independent hardware, software or firmware. Device 202 may be a computer, a laptop, a mobile phone, a smartphone, and so forth. Further, device 202 may include a processor 204, a memory 206, and hardware 208. Hardware 208 may include various Input/Output (IO) modules, network interfaces, Graphical User Interface (GUI) or other hardware that may enable device 202 to connect and/or communicate with other devices, hardware or users. Memory 206 may include an OS 212 that may support functioning of various applications on device 202. Examples of OS 212 include, but are not limited to, Windows, Linux, Macintosh, Android, Symbian, and so forth. Translator 106 may translate an application 214 in memory 206. Further, translator 106 may use information stored in a database 220 for translation. Database 220 may include, but is not limited to, information regarding the characteristics and performance metrics of the target platform. Database 220 and the functioning of translator 106 are explained in more detail in conjunction with FIGS. 3 and 4. Examples of memory 206 may include a Read Only Memory (ROM), a Random Access Memory (RAM), a hard disk, a solid-state disk or any other media that can store instructions or data. Processor 204 can execute the information or data stored in memory 206. Processor 204, memory 206 and hardware 208 may communicate with each other through a system bus 210. Although not shown, a person skilled in the art will appreciate that device 202 may include various other components to enable its functioning.

FIG. 3 illustrates components of translator 102, in accordance with an embodiment of the invention. As discussed above, translator 102 can translate a source application to a target application based on the target platform. Translator 102 may include an analysis module 302 that may analyze the source application. Analysis Module 302 may analyze the source application to generate a database containing characteristics of source assets. In an embodiment of the invention, analysis module 302 may generate and/or update database 220. The source code of the source application may be parsed to generate a list of source assets. Further, the source assets may be analyzed to generate the database of characteristics. For example, metadata of the source assets, such as the format, size, and resolution, may be analyzed by analysis module 302. Moreover, analysis module 302 may analyze the source code to count a number of times each source asset is referenced in the source code. Furthermore, analysis module 302 may generate templates based on the reference calls to the source assets in the source code. For example, source code in JAVA programming language for reference call to an asset may look like the following:

Image Ball=Toolkit.getDefaultToolkit( ).getImage.("C:\\myDir\\Ball.gif");

Therefore, the template generated for replacing the repeated reference calls to the asset can be:

asset_type     <object>=asset_reference_method(<location>)

As a result, translator 102 may help to make the actual translation of the source code to a target code more efficient and quicker, as parsing and tokenization routines of a translation process may be simplified.

Metrics module 304 of translator 102 may determine performance metrics for a target platform based on the characteristics of the source assets. The performance metrics may be the performance of the source assets on the target platform. Exemplary performance metrics may include, but are not limited to, load time, pre-loading time, dynamic Central Processing Unit (CPU) usage, download time, local or global memory usage, ratio of memory usage to CPU usage, and so forth. Metrics module 304 may generate the performance metrics for various source assets and may store them in database 220. In an embodiment of the invention, metrics module 304 may use metrics previously stored in database 220 for similar source assets. Moreover, metrics module 304 may generate a report that may include information for the source assets such as characteristics, location in source application, number of source assets, number of reference calls to the source assets in the source code, and the performance metrics of the target platform for the source assets. The report may then be presented to a programmer for his review or inputs. Moreover, the report may include recommendations for the programmer to select a source asset for processing. In an embodiment of the invention, the programmer can select the source assets to be processed by translator 102 based on the report. For example, the programmer may select a very frequently used asset to be processed instead of an asset that is used only once in the code. Similarly, the programmer can select an asset for processing that may require longer load time on the target platform. In another embodiment of the invention, translator 102 may automatically select the source asset for processing based on the performance metrics and the characteristics of the source assets.

Processing module 306 may process the source assets identified by metrics module 304 to generate target assets based on the performance metrics. For example, processing module 306 may change characteristics such as format of the source asset. In an embodiment of the invention, all media rich assets may be converted to a predetermined lossless format. For example, a number of different image formats may be converted to JPEG format, and similar processing may be done for video and audio assets. Moreover, processing module 306 may generate a report that may include statistics of the analysis and processing performed on the source assets. In an embodiment of the invention, processing module 306 may detect and delete duplicate source assets. The duplicate assets may be detected based on the information of source assets in the database. For example, multiple copies of a particular asset may exist in the source application, which may be reduced to a single unique asset. As a result of the processing, the target assets may be optimized for the best performance on the target platform. Moreover, the translation of the source code to the target code may be made quicker and more efficient. Furthermore, testing of the target code on target platform may not be required, because of the processing of the assets.

FIG. 4 is a flowchart of a method for managing assets during translation of the source application, in accordance with an embodiment of the invention. A source application may include source code and source assets. At step 402, the source application may be analyzed to generate a database of characteristics of source assets. In an embodiment of the invention, the source code may be analyzed to identify the source assets. In another embodiment of the invention, folders containing the source assets may be analyzed to identify the source assets. Subsequently, the characteristics of the source assets may be analyzed, for example, based on the metadata of the source assets.

Thereafter, at step 404, performance metrics of the target platform may be determined based on the characteristics of the source assets. Further, duplicate source assets may be determined based on the information from the source assets, and the duplicate assets may be deleted to reduce them to a unique copy of a source asset. Moreover, a report may be generated based on the performance metrics and reference calls to the source assets in the source code. Furthermore, the report may include recommendations for the programmer to select the source assets for processing.

Subsequently, at step 404, the source assets may be processed based on the determined performance metrics. For example, the format of the source assets may be changed based on the performance metrics. In an embodiment of the invention, the processing may be performed based on the selection of source assets by the programmer from the report. In another embodiment, source assets may be automatically selected, e.g., based on the performance metrics. Furthermore, templates may be generated based on the reference calls to the source assets in the source code. Therefore, the source code may be translated quicker and efficiently.

Embodiments of the invention are described above with reference to block diagrams and schematic illustrations of methods and systems according to embodiments of the invention. It will be understood that each block of the diagrams and combinations of blocks in the diagrams can be implemented by computer program instructions. These computer program instructions may be loaded onto one or more general-purpose computers, special purpose computers, or other programmable data processing apparatus to produce machines, such that the instructions which execute on the computers or other programmable data processing apparatus create means for implementing the functions specified in the block or blocks. Such computer program instructions may also be stored in a computer-readable memory that can direct a computer or other programmable data processing apparatus to function in a particular manner, such that the instructions stored in the computer-readable memory produce an article of manufacture including instruction means that implement the function specified in the block or blocks. Furthermore, such computer program instructions may be made available for download and/or downloaded over a communication network.

While the invention has been described in connection with what is presently considered to be the most practical and various embodiments, it is to be understood that the invention is not to be limited to the disclosed embodiments, but on the contrary, is intended to cover various modifications and equivalent arrangements included within the spirit and scope of the appended claims.

This written description uses examples to disclose the invention, including the best mode, and also to enable any person skilled in the art to practice the invention, including making and using any devices or systems and performing any incorporated methods. The patentable scope the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for managing assets during translation of a source computer application to a target computer application, comprising:

analyzing, by a computing device, the source application to obtain and to store in a database characteristics of one or more source assets, wherein the database is configured to enable updating based on further analysis;

determining, by the computing device, one or more performance metrics for a target platform based on the characteristics of the source assets, wherein the target application is configured for execution on the target platform; and processing, by the computing device, the one or more source assets based on the performance metrics to generate one or more target assets.

2. The method of claim 1, wherein the processing comprises changing a format of the one or more source assets to generate the one or more target assets.

3. The method of claim 1, wherein the processing comprises changing one or more characteristics of the one or more source assets to generate the one or more target assets.

4. The method of claim 1, further comprising:
determining one or more duplicate source assets based on the characteristics of the one or more source assets; and
deleting one or more duplicate assets.

5. The method of claim 4, further comprising updating the database of characteristics.

6. The method of claim 1, wherein the characteristics include metadata of the source assets.

7. The method of claim 6, wherein the metadata includes one or more of format, size, or resolution.

8. A method for managing assets during translation of a source computer application to a target computer application, comprising:
analyzing, by a computing device, the source application to generate a database of characteristics of one or more source assets, wherein the analyzing the source application further comprises:
determining one or more reference calls to the one or more source assets in code of the source application; and
generating one or more templates based on the reference calls in the code of the source application;
determining, by the computing device, one or more performance metrics for a target platform based on the characteristics of the source assets, wherein the target application is configured for execution on the target platform; and
processing, by the computing device, the one or more source assets based on the performance metrics to generate one or more target assets.

9. The method of claim 8, further comprising generating one or more reports, wherein the one or more reports comprise statistics of the analysis of the source application and the one or more templates.

10. The method of claim 9, wherein the statistics comprise the performance metrics for the target platform.

11. The method of claim 1, further comprising providing for downloading computer-executable instructions that, upon execution, result in the implementation of operations corresponding to said analyzing, said determining, and said processing.

12. The method of claim 1, further comprising downloading computer-executable instructions that, upon execution, result in the implementation of operations corresponding to said analyzing, said determining, and said processing.

13. A computer implemented system for managing assets during translation of a source computer application to a target computer application, comprising:
a database for storing characteristics of one or more source assets of the source application to enable updating has on further analysis;
a memory coupled to the database, the memory configured to store one or more instructions for:
analyzing source code in the source application to obtain and to store in the database characteristics of the source assets;
determining one or more performance metrics for a target platform based on the characteristics of the source assets, wherein the target application is configured for execution on the target platform; and
processing the source assets based on the one or more performance metrics to generate one or more target assets; and
a processor coupled to the memory, wherein the processor is configured to execute the instructions stored in the memory.

14. The system of claim 13, wherein the processing comprises changing a format of the source assets to generate the target assets.

15. The system of claim 13, wherein the processing comprises changing characteristics of the source assets to generate the target assets.

16. The system of claim 13, wherein the instructions further include instructions for:
determining one or more duplicate source assets based on the characteristics of the source assets; and
deleting one or more duplicate assets.

17. The system of claim 16, wherein the instructions further include instructions for updating the database of characteristics of the source assets.

18. A computer implemented system for managing assets during translation of a source computer application to a target computer application, comprising:
a database for storing characteristics of one or more source assets of the source application;
a memory coupled to the database, the memory configured to store one or more instructions for:
analyzing source code in the source application to obtain and to store in the database characteristics of the source assets, wherein the instructions for analyzing the source code further comprise instructions for:
determining one or more reference calls to the source assets in the source code; and
generating one or more templates based on the reference calls;
determining one or more performance metrics for a target platform based on the characteristics of the source assets, wherein the target application configured for execution on the target platform; and
processing the source assets based on the one or more performance metrics to generate one or more target assets; and
a processor coupled to the memory, wherein the processor is configured to execute the instructions stored in the memory.

19. The system of claim 18, wherein the instructions further include instructions for generating one or more reports, wherein the reports comprise statistics of the analysis of the source code and the templates.

20. The system of claim 19, wherein the statistics comprise the performance metrics for the target platform.

21. A non-transitory computer-readable medium having computer-executable instructions executable by a processor for managing assets during translation of a source application to a target application, the instructions being designed to result in the implementation of operations comprising:
analyzing the source application to obtain and to store in a database characteristics of one or more source assets, wherein the database is configured to enable updating based on further analysis;
determining one or more performance metrics for a target platform based on the characteristics of the one or more source assets, wherein the target application is configured for execution on the target platform; and
processing the one or more source assets based on the performance metrics to generate one or more target assets.

22. The computer-readable medium of claim 21, wherein the processing comprises changing a format of the source assets to generate the target assets.

23. The computer-readable medium of claim 21, wherein the processing comprises changing one or more characteristics of the source assets to generate the target assets.

24. The computer-readable medium of claim 21, wherein the operations further comprise:
  determining one or more duplicate source assets based on the characteristics of the source assets; and
  deleting one or more duplicate assets.

25. The computer-readable medium of claim 24, wherein the operations further comprise updating the database of characteristics of the source assets.

26. A non-transitory computer-readable medium having computer-executable instructions executable by a processor for managing assets during translation of a source application to a target application, the instructions being designed to result in the implementation of operations comprising:
  analyzing the source application to generate a database of characteristics of one or more source assets, wherein analyzing the source application further comprises:
    determining one or more reference calls to the one or more source assets in source code of the source application; and
    generating one or more templates based on the one or more reference calls;
  determining one or more performance metrics for a target platform based on the characteristics of the one or more source assets, wherein the target application is configured for execution on the target platform; and
  processing the one or more source assets based on the performance metrics to generate one or more target assets.

27. The computer-readable medium of claim 26, wherein the operations further comprise generating one or more reports, wherein the reports comprise statistics of the analysis of the source code and the templates.

28. The computer-readable medium of claim 27, wherein the statistics comprise the one or more performance metrics for the target platform.

29. An apparatus for translating a source application to a target application, comprising:
  an analysis module configured to analyze the source application to obtain and to store in a database characteristics of one or more source assets, wherein the database is configured to enable updating based on further analysis;
  a metrics module configured to determine one or more performance metrics for a target platform based on the characteristics of the source assets, wherein the target application is configured for execution on the target platform; and
  a processing module configured to process the one or more source assets based on the performance metrics to generate one or more target assets,
  wherein at least one of the analysis module, the metrics module, or the processing module is implemented at least in part as a hardware device.

30. The apparatus of claim 29, wherein a format of the one or more source assets is changed to generate the one or more target assets.

31. The apparatus of claim 29, Wherein at least one characteristic of the one or more source assets is changed to generate the one or more target assets.

32. The apparatus of claim 29, wherein the processing module is further configured to:
  determine one or more duplicate source assets based on the characteristics of the source assets; and
  delete one or more duplicate assets.

33. The apparatus of claim 29, wherein the processing module is further configured to generate one or more reports, wherein the one or more reports comprise statistics of analysis of the source application performed by the analysis module.

34. The apparatus of claim 29, wherein the processing module is further configured to generate one or more reports, wherein t he one or more reports comprise one or more templates based on one or more reference calls found in the source application.

35. An apparatus for translating a source application to a target application, comprising:
  an analysis module configured to analyze the source application to generate a database of characteristics of one or more source assets, wherein the analysis module is further configured to:
    determine one or more reference calls to the source assets in source code of the source application; and
    generate one or more templates based on the one or more reference calls;
  a metrics module configured to determine one or more performance metrics for a target platform based on the characteristics of the source assets, wherein the target application is configured for execution on the target platform; and
  a processing module configured to process the one or more source assets based on the performance metrics to generate one or more target assets,
  wherein at least one of the analysis module, the metrics module, or the processing module is implemented at least in part as a hardware device.

* * * * *